(12) United States Patent
Longenecker

(10) Patent No.: US 10,906,436 B2
(45) Date of Patent: Feb. 2, 2021

(54) QUICK RELEASE APPARATUS FOR A LATCH CONNECTOR ON A BOOSTER SEAT

(71) Applicant: ARTSANA USA, INC., Lancaster, PA (US)

(72) Inventor: Michael L. Longenecker, Lancaster, PA (US)

(*) Notice: Subject to any disclaimer, the term of this patent is extended or adjusted under 35 U.S.C. 154(b) by 0 days.

(21) Appl. No.: 16/280,225

(22) Filed: Feb. 20, 2019

(65) Prior Publication Data

US 2019/0255975 A1  Aug. 22, 2019

Related U.S. Application Data

(60) Provisional application No. 62/633,220, filed on Feb. 21, 2018.

(51) Int. Cl.
*B60N 2/28* (2006.01)

(52) U.S. Cl.
CPC ......... *B60N 2/2893* (2013.01); *B60N 2/2866* (2013.01)

(58) Field of Classification Search
CPC ............................ B60N 2/2893; B60N 2/2866
USPC ........................................................ 297/253
See application file for complete search history.

(56) References Cited

U.S. PATENT DOCUMENTS

| | | |
|---|---|---|
| 7,338,120 B2 | 3/2008 | Gastaldi |
| 7,488,038 B2 | 2/2009 | Boyle et al. |
| 8,256,840 B2 | 9/2012 | Dasent et al. |
| 8,833,854 B2 | 9/2014 | Lu et al. |
| 8,894,151 B2 | 11/2014 | Poniatowski et al. |
| 8,967,715 B2 | 3/2015 | Carpenter et al. |
| 8,973,991 B2 | 3/2015 | Wuerstl |
| 9,272,641 B2 | 3/2016 | Hartenstine et al. |
| 9,481,271 B2 | 11/2016 | Hartenstine et al. |

FOREIGN PATENT DOCUMENTS

EP         2851237 A1    3/2015

*Primary Examiner* — Anthony D Barfield
(74) *Attorney, Agent, or Firm* — Patent Law Associates

(57) ABSTRACT

A child booster seat for use in a vehicle having a pair of LATCH connectors selectively attachable to the vehicle, the connectors having a first web member operably connected thereto enabling the connectors to be drawn closer to the seat for securely connecting the seat to the vehicle and a second web member operably connected to the LATCH connectors for release the LATCH connector from the vehicle, the relative lengths of the first and second webs configured so that the second web will operate and release the LATCH connector from the vehicle before the first web is fully extended from the seat as the seat is being removed from the vehicle.

15 Claims, 11 Drawing Sheets

QUICK RELEASE APPARATUS FOR A LATCH CONNECTOR ON A BOOSTER SEAT

CROSS REFERENCE TO RELATED APPLICATIONS

This application claims priority benefit of U.S. provisional patent application Ser. No. 62/633,220 filed on Feb. 21, 2018.

BACKGROUND OF THE INVENTION

This invention relates generally to the field of child carriers for use in vehicles, and, more particularly to a quick release apparatus for LATCH connectors used to secure a child booster seat in a vehicle.

Children's car seats, including booster seats, have made automobile travel substantially safer for children; however, as most parents are aware, properly installing and removing such seats is typically difficult and sometimes frustrating. Installing the typical booster seat requires connecting two Lower Anchors and Tethers for Children (LATCH) connectors to anchor point in the vehicle and tensioning a belt or the like to secure the booster seat to the vehicle. Removing the booster is even more difficult, requiring release of the tensioning apparatus as well as individually disconnecting the LATCH connectors before the booster seat can be removed.

Significant benefit for convenience and ease of use would be realized by a booster seat LATCH connection apparatus that provide a single tether for tensioning the connection apparatus when installing the seat and which combines de-tensioning and LATCH disconnection in a single step.

SUMMARY OF THE INVENTION

Accordingly, the present invention, in any of the embodiments described herein, may provide one or more of the following advantages:

It is an object of the present invention to provide an apparatus for securing a child's booster seat into a vehicle wherein releasing tension on an anchoring web enables the booster to be removed and releases LATCH anchors from their connection to the vehicle in a single operation. The LATCH anchors include a release actuator that enables disengagement from the vehicle anchors that is actuate by applying a force to the actuator. A release web separate from the securing web is connected between the actuator and the booster seat, the release web having a shorter length than the slack length of the securing web.

It is a further object of the present invention to provide an apparatus for securing a child's booster seat into a vehicle that enables removal of the booster seat using only one hand. A tensioning tether web used to secure the seat includes a cam-lock release that is disposed along the forward end of the seat where it is easily accessed when the seat is installed in a vehicle. Activating the cam-lock release may be accomplished by pressing a button or the like while grasping the seat and pulling outwardly away from the LATCH connections.

It is a still further object of the present invention to provide an apparatus for securing a child's booster seat into a vehicle that may employ a mechanically-advantaged tensioning mechanism to reduce the tension force a user must apply to the apparatus to properly secure the booster seat to the vehicle. The tensioning mechanism includes one or more slides around which the tether web is routed so that the web is looped to mechanically advantage tension applied to the web, as with a conventional block-and-tackle pulley arrangement. A releasable cam-lock device retains tension in the web to maintain the booster seat secured to the vehicle.

It is a still further object of the present invention to provide an apparatus for securing a child's booster seat into a vehicle that is durable in construction, inexpensive of manufacture, carefree of maintenance, easily assembled, and simple and effective to use.

These and other objects are achieved in accordance with the present invention by providing a child booster seat for use in a vehicle having a pair of LATCH connectors selectively attachable to the vehicle, the connectors having a first web member operably connected thereto enabling the connectors to be drawn closer to the seat for securely connecting the seat to the vehicle and a second web member operably connected to the LATCH connectors for release the LATCH connector from the vehicle, the relative lengths of the first and second webs configured so that the second web will operate and release the LATCH connector from the vehicle before the first web is fully extended from the seat as the seat is being removed from the vehicle.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Figure 1:
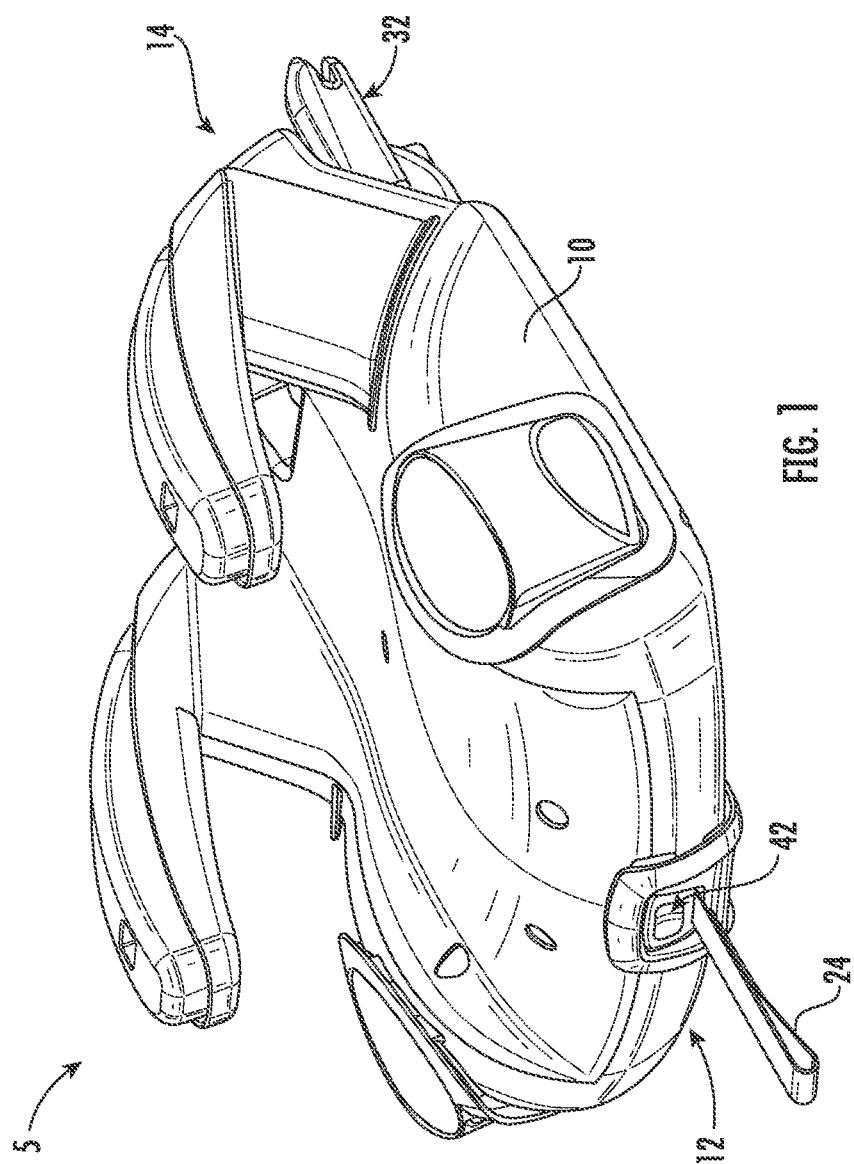
FIG. 1 is a perspective view of a child's booster seat having a LATCH anchoring system embodying aspects of the present invention wherein the anchoring system is positioned as it would be when installed for use in a vehicle.
Figure 2:
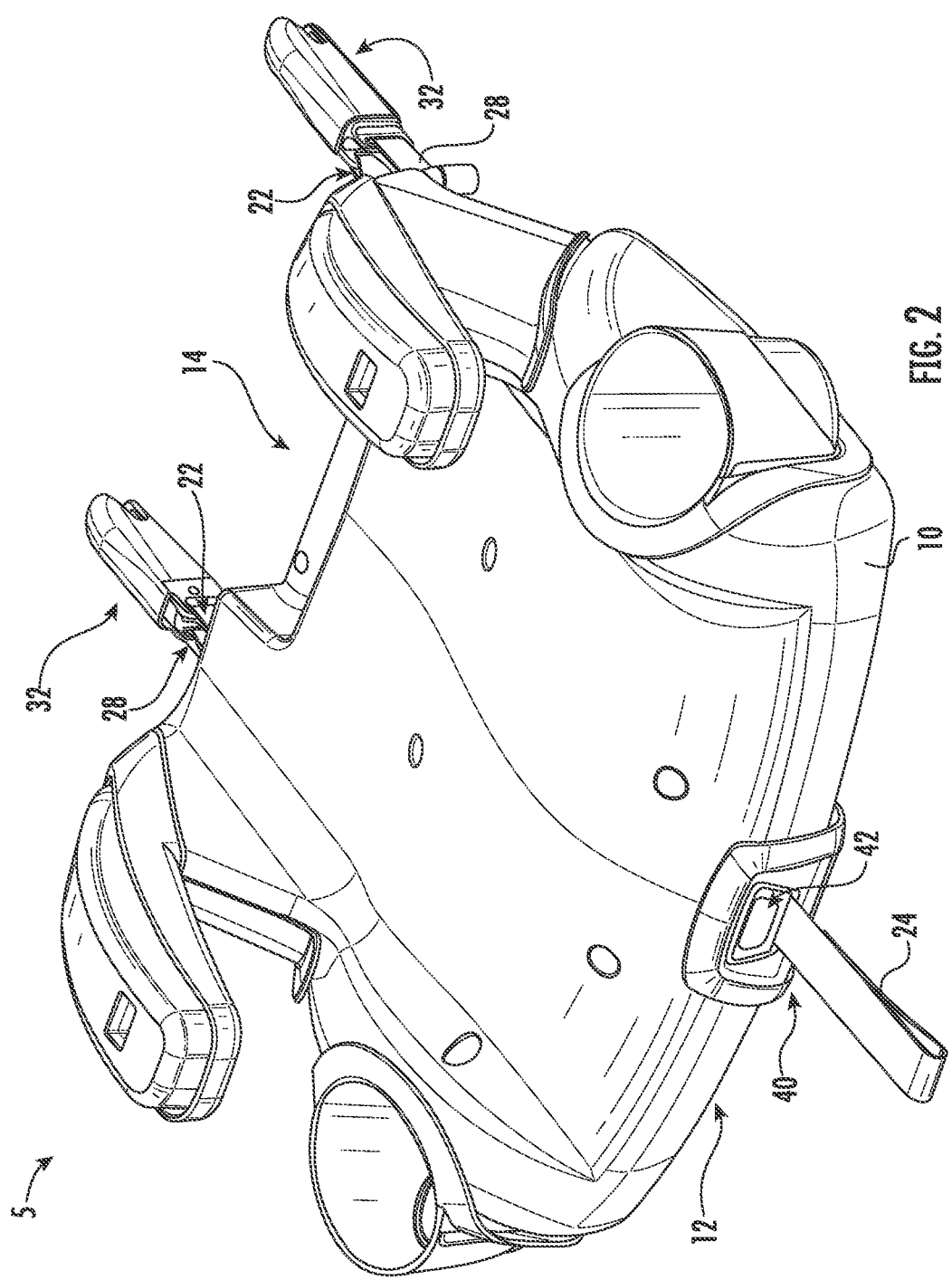
FIG. 2 is a perspective view of the booster seat of FIG. 2 shown with the anchoring system positioned as it would be when the seat is being removed from the vehicle.
Figure 3:
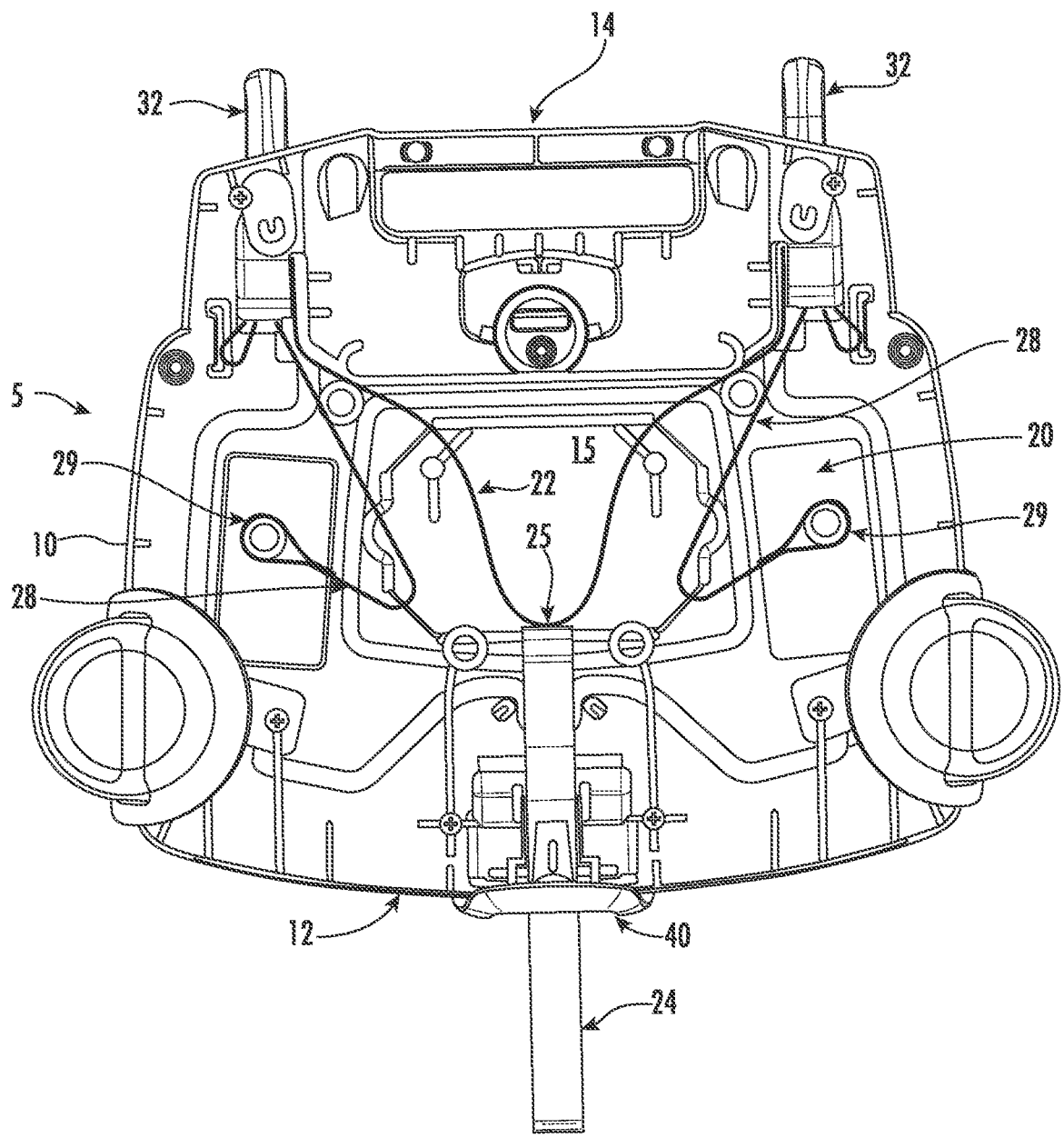
FIG. 3 is a partial view of the interior of the booster seat of FIG. 1 showing the internal arrangement of the anchoring system.
Figure 4:
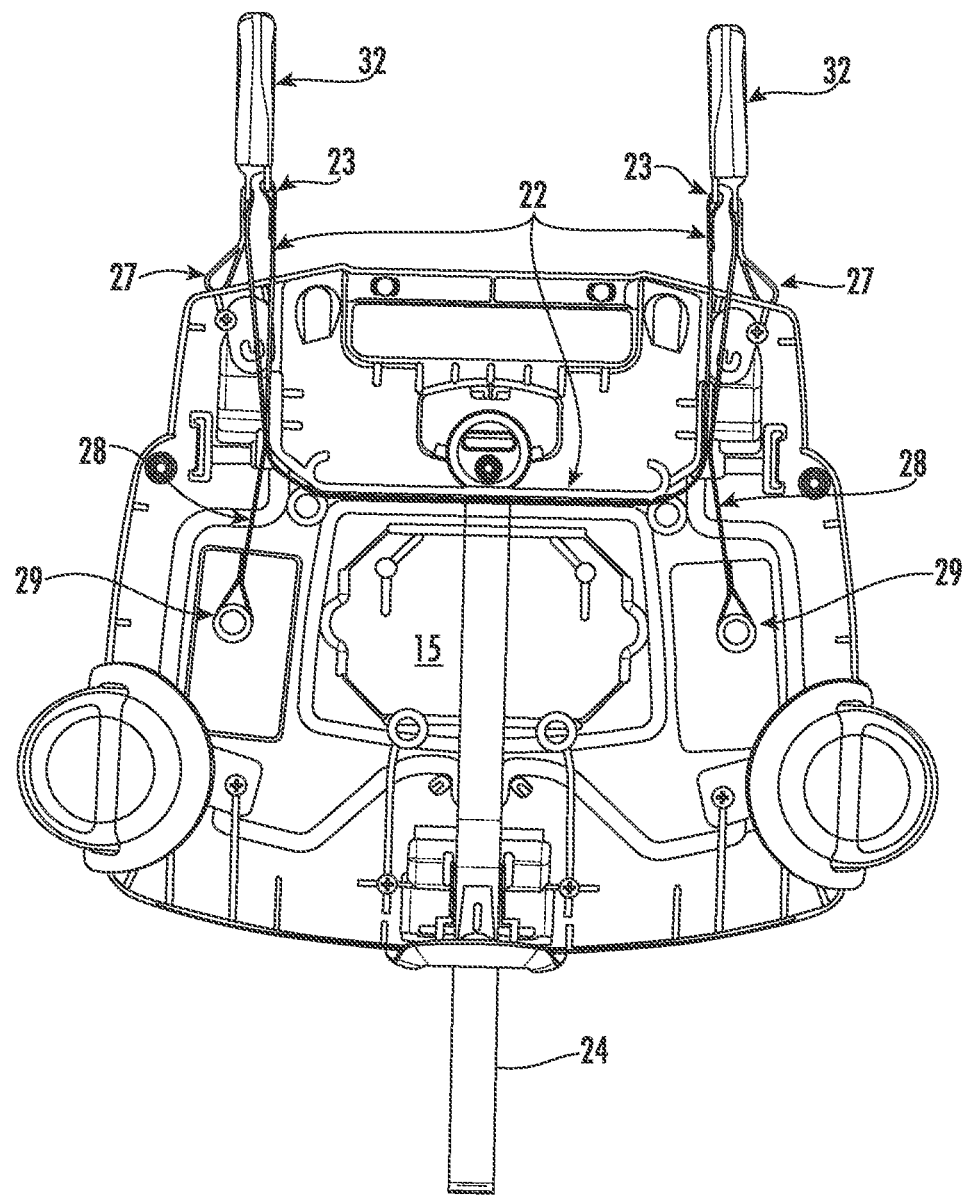
FIG. 4 is a partial view of the interior of the booster seat of FIG. 2 showing the internal arrangement of the anchoring system.
Figure 5:
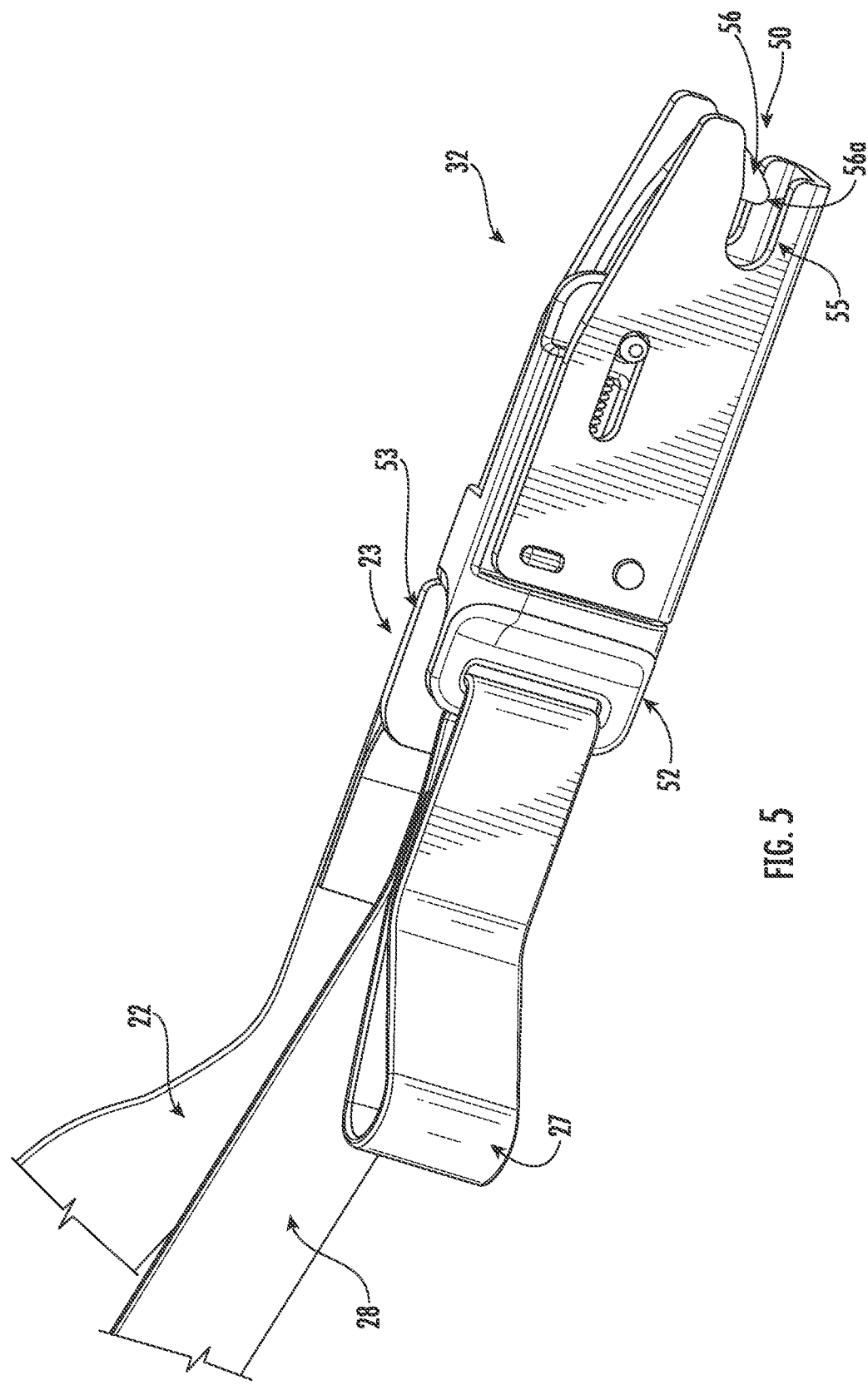
FIG. 5 is a first view of a LATCH connector used in the anchoring system of the instant booster seat shown in the latched configuration.
Figure 6:
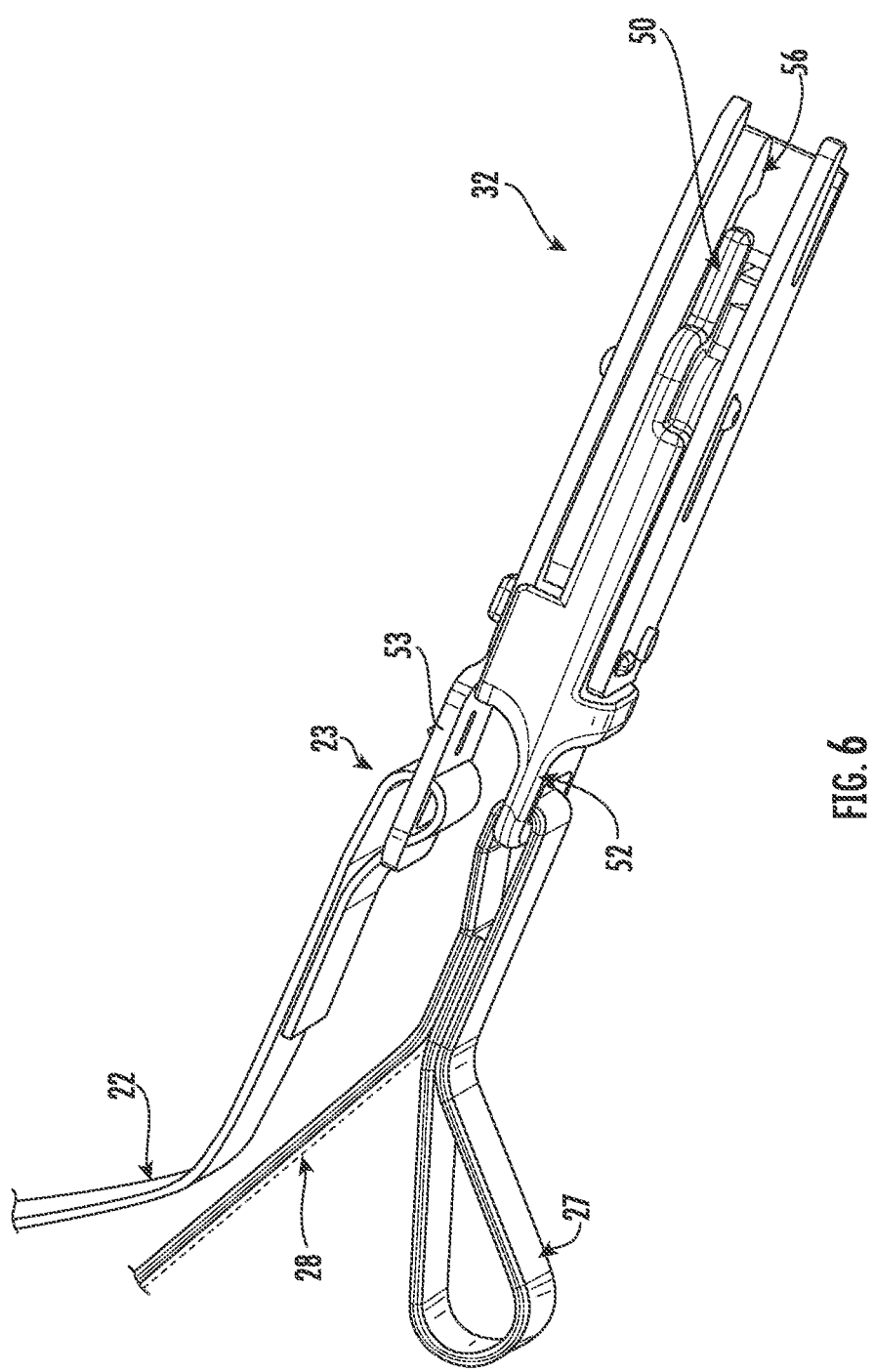
FIG. 6 is a second view of a LATCH connector of FIG. 5 shown in the latched configuration.
Figure 7:
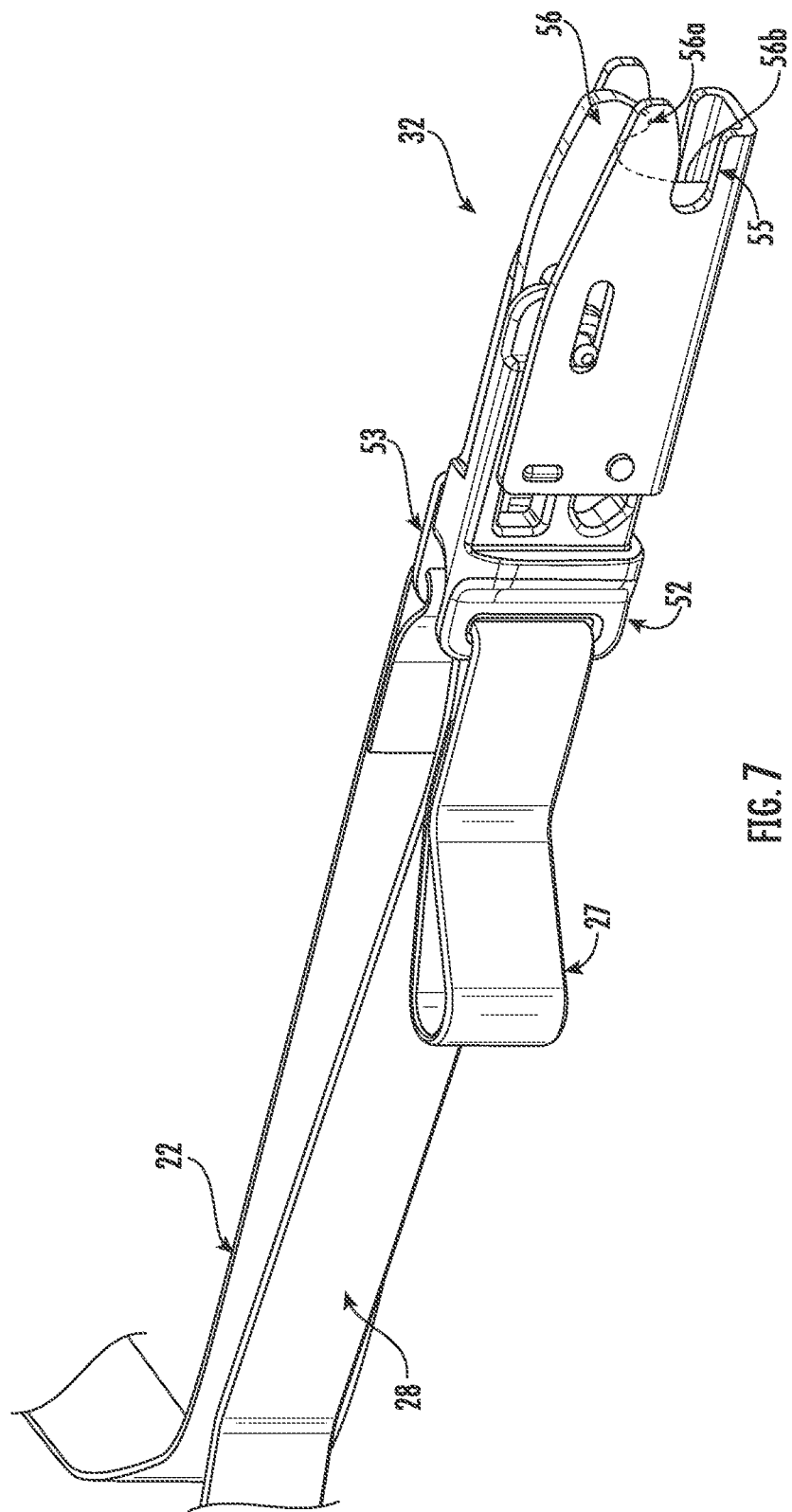
FIG. 7 is a first view of a LATCH connector used in the anchoring system of the instant booster seat shown in the unlatched configuration.
Figure 8:
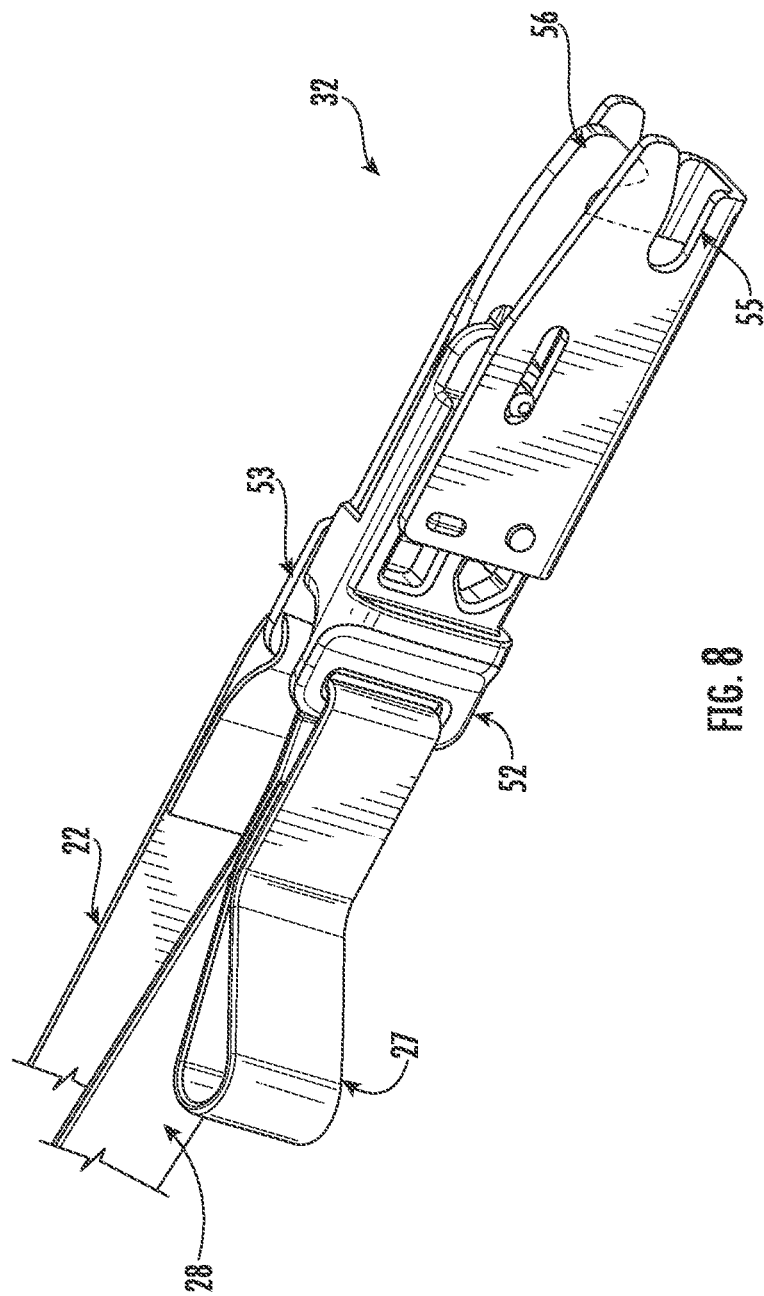
FIG. 8 is a second view of a LATCH connector of FIG. 7 shown in the unlatched configuration.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail.

Also, any reference herein to the terms "up" or "down," or "top" or "bottom" are used as a matter of mere convenience and are determined as the seat would normally be positioned in a vehicle for use by a child. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring to the figures, an exemplary booster seat 5 incorporating principles of the present invention is shown in FIGS. 1 through 4 comprising a base structure 10 having generally opposing forward 12 and rearward ends 14. When the booster seat 5 is in use, the base structure 10 is positioned to rest upon a vehicle seating surface with the rearward end 14 positioned adjacent to an upwardly oriented vehicle seat back.

The booster seat 5 includes and anchoring system 20 that enables the seat 5 to be secured to a LATCH anchors that are commonly provided in vehicles. Two LATCH connectors 32 are provided, generally positioned on opposing sides of the rearward end 14 of the seat 5. The position locates the connectors 32 adjacent to the typical LATCH anchor locations in vehicle rear seats when the booster seat 5 is positioned for use.

The booster seat 5 includes an interior space 15 housing a portion of the anchoring system 20. The anchoring system 20 comprises an elongate tensioning web 22 connected at opposing ends 23 to anchor connectors 53 provided on one end of each of the respective LATCH connectors 32. The interior space 15 is configured to guide movement of the tensioning web 22 enabling the displacement (defined by the portion of the tensioning web 22 extending outside of the base structure 10) of the opposing ends 23 from the exterior of the booster to be varied. A pull extension 24, preferably formed from a web similar in configuration used for the tensioning web, is fixedly connected at an intermediate position 25 on the tensioning web 22 between the two LATCH connector anchor connectors 53 that enables simultaneous movement of both LATCH connector 32 in relation to the seat 5 with a single interface by retracting the ends 23 of the tensioning web 22 toward the interior space 15 and drawing the LATCH connectors 32 closer to the seat 5. The pull extension 24 is directed through a web-locking apparatus 40 that restrains the pull extension 24 in a selected position once it is pulled to secure the tensioning web 22 thereby fixing the displacement of the opposing ends 23 and LATCH connectors 32 from the booster seat and securing the seat 10 in the vehicle. A release mechanism 42 is provided on an accessible portion of the seat to allow selective release of the web-locking apparatus 40 and de-tension the tensioning web 22 so that the booster seat may displaced from the LATCH anchors which may remain anchored to the vehicle seat.

The base structure 10 may further include guides and anchor points for the ends of the tensioning web 22 to enable alternative configurations for the path of the tensioning web within the seat. Anchor connectors 53 on each of the LATCH connectors 32 may be configured to allow the tensioning web 22 to be looped through the connectors 53. Securing the opposing ends 23 to the seat and looping the tensioning web 22 through the anchor connectors 53 in a manner permitting the web to slide relative to the loop produces a force multiplying effect that reduces tension force required to be applied at the grasp handle 24 to achieve the desired securing force for the seat in the vehicle.

The length of the tension web 22 determines the maximum extent to which the LATCH connectors 32 may be displaced from the seat base support 10. It is preferable to provide sufficient length in the tensioning web 22 to allow a user to easily access each LATCH connector 32 and engage it on a respective LATCH anchor in the vehicle while limiting the length of the tensioning web 22 so that the tensioning web may be sufficiently displaced within the confines of the seat base to enable the seat to be secured to the vehicle.

Referring to FIGS. 5 through 11, each LATCH connector 32 includes a releasable retention mechanism 50 including a moveable hook 56 pivoting about axle 59 that selectively blocks a U-shaped receptacle 55 in the connector 32 to trap a LATCH anchor provided in the vehicle therein. A blocking portion 56A of the hook 56 traps the LATCH anchor in the connector 32. Contact between the LATCH anchor and an engaging portion 56B of the hook 56 moves the hook into the latched position as the connector 32 is engaged with the vehicle LATCH anchor. The retention mechanism 50 retains the hook 56 in the latch position to secure the booster seat 5 to the vehicle until it is selectively released by a user.

Each LATCH connector 32 further includes a bi-directionally moveable release actuator 52 that enable selective unlatching and disengagement of the moveable hook 56. An elongate releasing web 28 is connected to the release actuators 52 of each LATCH connector 32. The releasing web 28 may be a single web that is routed through and anchored to the support base or individual webs connecting each release actuator 52 individually to the support base 10. The ends 26 of the releasing web 28 extending from the support base are arranged generally parallel with the respective ends 23 of the tensioning web 22 connected to the respective LATCH connector so that tension forces from either web are applied to the LATCH connector in generally the same axial direction. The length of each releasing web 28 may be fixed and is necessarily shorter than the extent to which the tensioning web 22 may be extended from the support base. As the support base 10 is being moved away from the LATCH connectors anchored to the vehicle following release of the web-locking apparatus 40, the extent of the releasing web 28 will be reached prior to the full extent of the tensioning web 22. Further forward/outward movement of the seat 5 in relation to the latch connectors 32 tensions the releasing web 28 and applies force on the release actuators 52, releasing the LATCH connectors 32 and allowing them to disengage the LATCH anchors in the vehicle. This operation is accomplished by pulling the seat 5 away from the vehicle seat while operating the release mechanism 42 of the web locking mechanism 40.

The release mechanism is configured to permit easy user operation with one hand actuating the release mechanism 42 and pulling the seat away from the vehicle. The benefit of the arrangement is that a user may grab the seat 5 in a manner to release the cam-lock 40 securing the grab handle 24 tether and pull the seat 5 outwardly away from the vehicle seat. This movement will extend the tensioning web 22 as the LATCH connectors 32 remain attached to the LATCH anchors. As the extent of the releasing webs 28 is reached but prior to the tensioning web 22 being fully extended, the LATCH connectors 32 will be released to disengage from the LATCH anchors. The user need only to activate a single releasing device (the cam-lock release 42) and pull the booster seat away from the vehicle seat to completely unlatch the booster seat 5 and completely remove it from the vehicle. It is intended as an operation that can be accomplished with only a single hand by a user.

Figure 9:
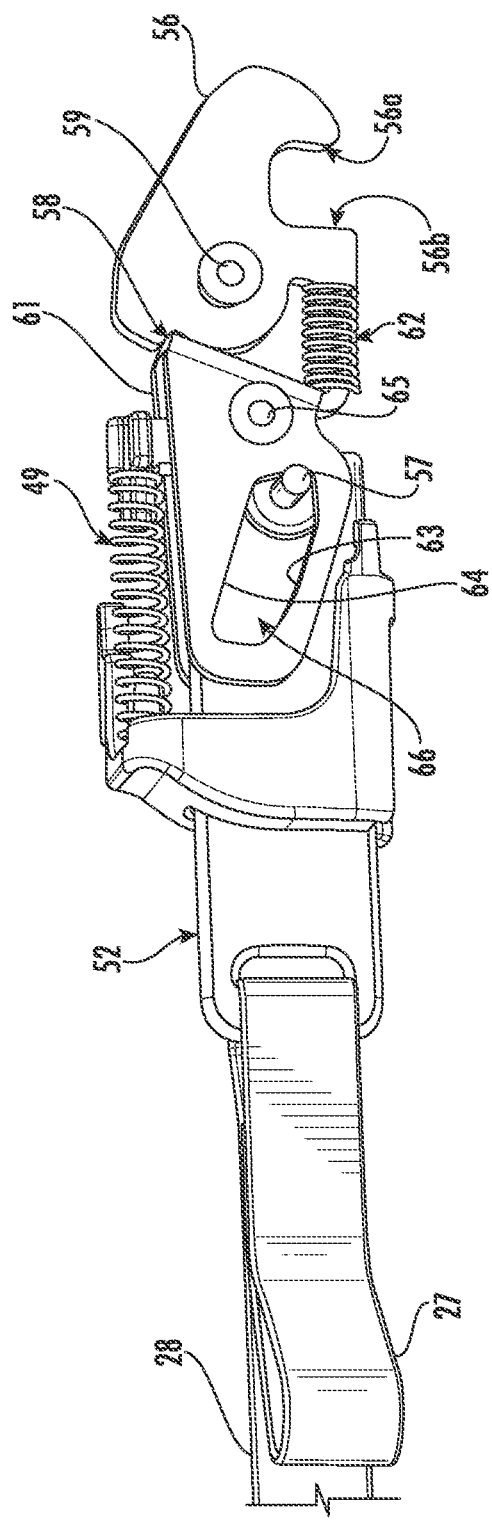
FIGS. 9 through 11 provide a partial view of the internal arrangement of the LATCH connector of FIGS. 5 through 7 to illustrate operating of a release mechanism as it is repositioned between latched, released, and open/disengaged positions.
Figure 10:
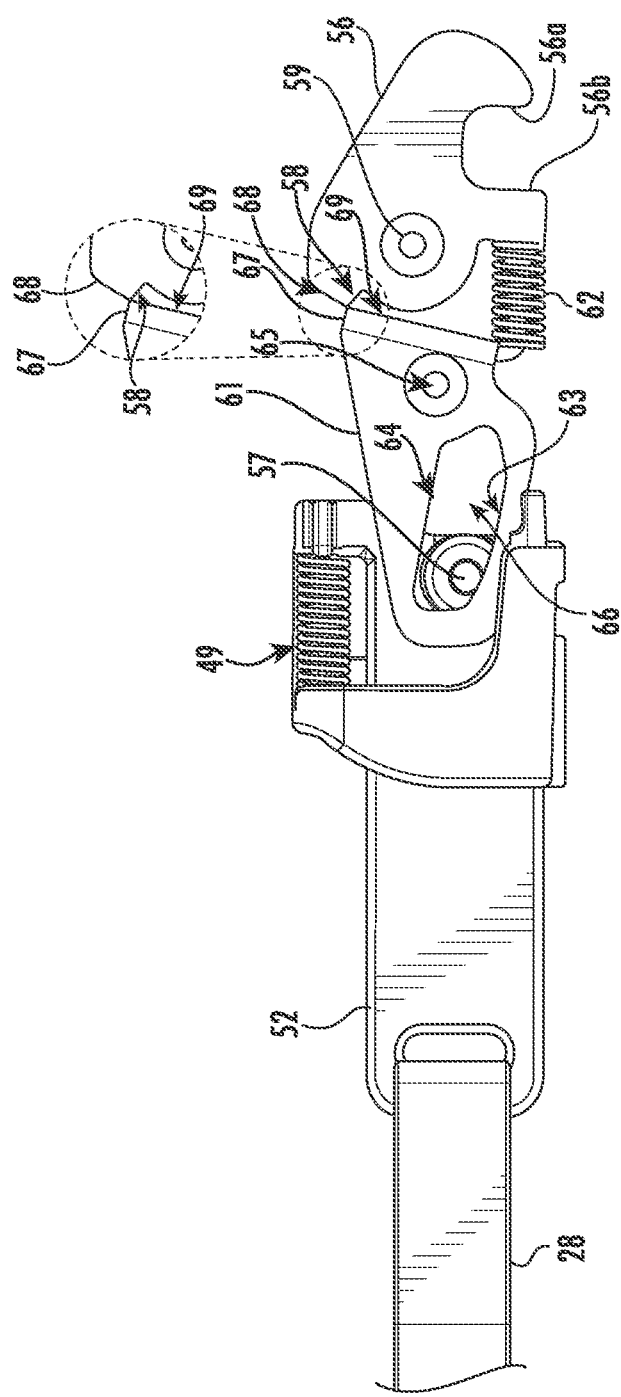
Figure 11:
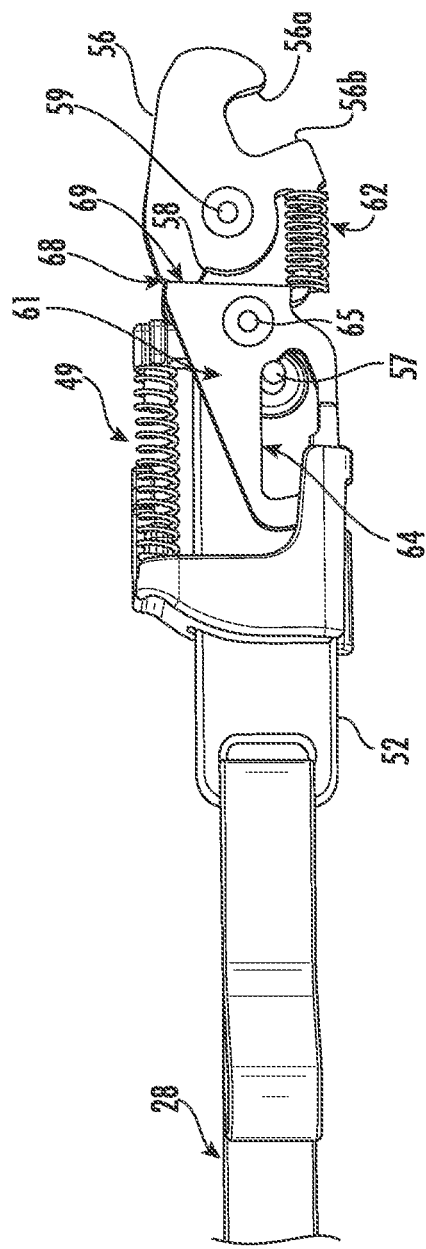

For the retention mechanism 50 to function (release) properly, the forces necessary to release the mechanism must be relatively low so that the seat can be easily removed from a vehicle when so desired. As is best illustrated in FIGS. 9 through 11 in conjunction with FIGS. 5 through 8, disengaging the releasable retention mechanism 50 from the LATCH connector 32 is initiated by repositioning the bi-directionally moveable release actuator 52 from a locked position (FIGS. 5, 6, and 9) to a release position (FIGS. 7, 8, 10 and 11). Bi-directional movement of the release actuator 52 is generally parallel to the longitudinal axis of the connector 32. The release actuator 52 is biased toward the locked position by resilient member 49 acting on the release actuator 52 and the LATCH connector frame. A driving member 57 affixed to the release actuator 52 acts upon a first surface 63 of guide cam 66, part of moveable blocking element 61, when the release actuator 52 is moved toward the release position and blocking element 61 is positioned when the LATCH connector is locked. The driving member 57 acting on the first surface 63 repositions the blocking element 61 by pivoting about a pivot pin 65. The pivoting movement of the blocking element 61 from a blocking position (FIG. 9) to a non-blocking position (FIG. 10) withdraws blocking structure 67 from adjacent contact with retaining surface 58 on hook 56, allowing the hook 56 to pivot out of a latched position (FIGS. 9, 10) toward an unlatched position (FIG. 11). As the blocking element 61 moves fully into the unlocked position (FIG. 11), a second surface 64 of cam 66 comes into contact with the driving member 57. Except during transitions between the first and second cam surfaces occurring while the release actuator 52 is in the extreme positions of its movement (either the released or locked position), the driving member 57 does not contact both cam surfaces simultaneously during movement of the release actuator 52. The configuration of the second surface 57 and its orientation with respect to the driving member 57 while the blocking element 61 is in the unlocked position permits complete movement of the releasing actuator 52 between the locked and released positions without causing movement of the blocking member 61 from the unlocked position. Movement of the blocking element 61 also shifts a spring 62 that biases movement of the moveable hook 56 to increase the biasing force applied to drive the hook 56 into the open or disengaged position when the blocking element 61 releases the hook 56.

The retention mechanism release configuration reduces the force required to be applied to the release actuator 52 by isolating the release actuator from the mechanism that locks moveable hook 56 in position. The driving member 57 and cam 66 increase the mechanical advantage of the force applied to the release actuator 52 to reposition the blocking element 61.

The moveable hook 56 is biased toward the released position by resilient element 62. The moveable hook 56 is moved toward the latched position by contact with the LATCH anchor in the vehicle as the LATCH connector Upon movement toward the latched position, the retention mechanism 50 maintains the hook 56 in a position engaging the LATCH anchor thereby securing the connector to the vehicle. Upon release by the actuator 52, the moveable hook 56 moves and, after a predefined degree of movement, is forced toward the released position. Movement of the hook 56 as well as the contour of the engaging portion 56B of the hook 56 interacts with the vehicle LATCH anchor to urge the LATCH connector 32 away from the vehicle-mounted LATCH anchor thereby assuring proper disengagement and release of the booster seat 5 from the vehicle.

The releasing webs 28 may be provided with additional handles 27 positioned adjacent to the LATCH connectors 32 to provide a second means to release an individual LATCH connector 32. The secondary releasing means are intended as a precautionary backup in the event tensioning or release webs become entangled and prevent release and disengagement of the seat by the normal means.

Naturally, the invention is not limited to the foregoing embodiments, but it can also be modified in many ways without departing from the basic concepts. Changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. An anchoring system for securing a child booster seat to a LATCH anchor in a vehicle comprising:
   an elongate tensioning web partially disposed in an internal portion of the booster seat and having at least one end extending externally therefrom;
   an external connector assembly configured to releasably engage the vehicle LATCH anchor, the external connector assembly having an anchor connector to which is connected a first end of the tensioning web, and a releasable retention mechanism, the retention mechanism having a release actuator bi-directionally moveable between locked and release positions;
   a release web connected at a first end to the booster seat and at a second end to the release actuator, the release web having a fixed length extending between the first and second ends, the release web operable to move the release actuator from the locked to the released position; and
   an adjuster mechanism configured to vary the length of an extension portion of the tensioning web extending externally between the booster seat and the external connector, the length of the tension web enabling the extension portion length to be greater than the release web fixed length, tension in the release web moving the release actuator toward the released position when the extension portion is extended externally to a length greater than the release web fixed length.

2. The anchoring system of claim 1, wherein the adjuster mechanism comprises a pull extension connected to the tension web, the pull extension releaseably restrained by a web-locking apparatus that restrains the pull extension in a selected position thereby restraining the LATCH connectors in a fixed position in relation to the seat base.

3. The anchoring system of claim 2, wherein the pull extension comprises a length of web material and the adjuster mechanism comprises a cam-lock device engaging the pull extension.

4. The anchoring system of claim 1, wherein the external connector assembly further comprises a pivoting hook moveable between generally opposing latched and unlatched positions and a pivoting blocking member moveable between a blocking position in which the pivoting hook is restrained in the latched position and a non-blocking position in which the pivoting hook may move between latched and unlatched positions, the pivoting hook blocking a U-shaped receptacle in the connector assembly when in the latched position thereby trapping the LATCH anchor therein.

5. The anchoring system of claim 4, further comprising a first resilient member positioned between the pivoting hook and the blocking member biasing the pivoting hook toward the unlatched position and the blocking member toward the blocking position.

6. The anchoring system of claim 4, wherein the release actuator includes a driving member engaging a cam on the blocking member, the cam having a first surface engaged by the driving member to pivot the blocking member from the blocking position to the non-blocking position as the release actuator is moved from the locked position toward the released position, and a second surface that allows release actuator movement between the locked and released positions while the blocking member remains in the non-blocking position.

7. The anchoring system of claim 6, wherein the driving member nonsimultaneously engages the first surface or the second surface as the release actuator moves between the locked and released positions.

8. An anchoring system for securing a child seat to a LATCH anchor in a vehicle comprising:
 a connector assembly having an anchor connector and a retention mechanism configured to releasably engage the vehicle LATCH anchor, the retention mechanism having a release actuator linearly moveable between locked and release positions, a pivoting hook moveable between generally opposing latched and unlatched positions, and a pivoting blocking member moveable between a blocking position in which the pivoting hook is restrained in the latched position and a non-blocking position in which the pivoting hook may move between latched and unlatched positions, the pivoting hook blocking a U-shaped receptacle in the connector assembly when in the latched position thereby trapping the LATCH anchor therein;
 an adjustable length tensioning web connecting the anchor connector to the child seat; and
 a fixed length release web connected at a first end to the child seat and at a second end to the release actuator, the release web moving the release actuator from the locked position to the release position as the booster seat is displaced from the connector assembly to a position at which the release web is taut, further displacement of the booster seat repositioning the release operator to release the retention mechanism and disengage the connector assembly from the vehicle LATCH anchor.

9. The anchoring system of claim 8, wherein the release actuator includes a driving member engaging a cam on the blocking member, the cam having a first surface engaged by the driving member to pivot the blocking member from the blocking position to the non-blocking position as the release actuator is moved from the locked position toward the released position, and a second surface that allows release actuator movement between the locked and released positions while the blocking member remains in the non-blocking position.

10. The anchoring system of claim 9, further comprising a first resilient member positioned between the pivoting hook and the blocking member biasing the pivoting hook toward the unlatched position and the blocking member toward the blocking position.

11. The anchoring system of claim 9, wherein the driving member nonsimultaneously engages the first surface or the second surface as the release actuator moves between the locked and released positions.

12. The anchoring system of claim 8, wherein the tensioning web is connected at a first end to the anchor connector and moveably connected to the child seat enabling variation in length of an adjustment portion of the tensioning web extending between the child seat and the connector assembly.

13. The anchoring system of claim 12, further comprising an adjuster mechanism configured to vary the length of an extension portion of the tensioning web.

14. The anchoring system of claim 13, wherein the adjuster mechanism comprises a pull extension connected to the tension web, the pull extension releaseably restrained by a web-locking apparatus that restrains the pull extension in a selected position thereby restraining the LATCH connectors in a fixed position in relation to the seat base.

15. The anchoring system of claim 14, wherein the pull extension comprises a length of web material and the adjuster mechanism comprises a cam-lock device engaging the pull extension.

* * * * *